United States Patent
Orteu et al.

(10) Patent No.: US 11,772,781 B2
(45) Date of Patent: Oct. 3, 2023

(54) AIRCRAFT INCLUDING A REINFORCED MAIN LANDING GEAR BOX

(71) Applicant: Airbus Operations SAS, Toulouse (FR)

(72) Inventors: Benoit Orteu, Toulouse (FR); Damien Sire, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/572,254

(22) Filed: Jan. 10, 2022

(65) Prior Publication Data
US 2022/0289365 A1 Sep. 15, 2022

(30) Foreign Application Priority Data
Jan. 12, 2021 (FR) ...................................... 2100260

(51) Int. Cl.
*B64C 25/04* (2006.01)
*B64C 25/10* (2006.01)

(52) U.S. Cl.
CPC .............. *B64C 25/04* (2013.01); *B64C 25/10* (2013.01)

(58) Field of Classification Search
CPC ................................ B64C 25/04; B64C 25/10
See application file for complete search history.

(56) References Cited

U.S. PATENT DOCUMENTS

| | | | | |
|---|---|---|---|---|
| 2012/0138746 A1* | 6/2012 | Guillemaut | ............... | B64C 1/26 244/123.1 |
| 2014/0151500 A1* | 6/2014 | Bellet | .................... | B64C 25/10 244/102 A |
| 2014/0158828 A1* | 6/2014 | Loyant | ..................... | B64C 1/26 244/131 |
| 2016/0185451 A1* | 6/2016 | Bellet | ...................... | B64C 1/18 244/129.1 |
| 2020/0331595 A1* | 10/2020 | Block | .................... | B64C 25/12 |

FOREIGN PATENT DOCUMENTS

EP 3725674 A1 10/2020

OTHER PUBLICATIONS

French Search Report; priority document.

* cited by examiner

*Primary Examiner* — Tye William Abell
(74) *Attorney, Agent, or Firm* — Greer, Burns & Crain, Ltd.

(57) ABSTRACT

An aircraft including two main landing gears and also a main landing gear bay configured to house, on either side of a vertical median plane, the two main landing gears in a retracted position, the main landing gear bay including a rear transverse wall, a front transverse wall and also an end wall that is approximately perpendicular to the rear and front transverse walls. The main landing gear bay includes at least one strut connecting the rear or front transverse wall and the end wall, approximately positioned in the vertical median plane.

8 Claims, 4 Drawing Sheets

Fig. 1
Prior Art
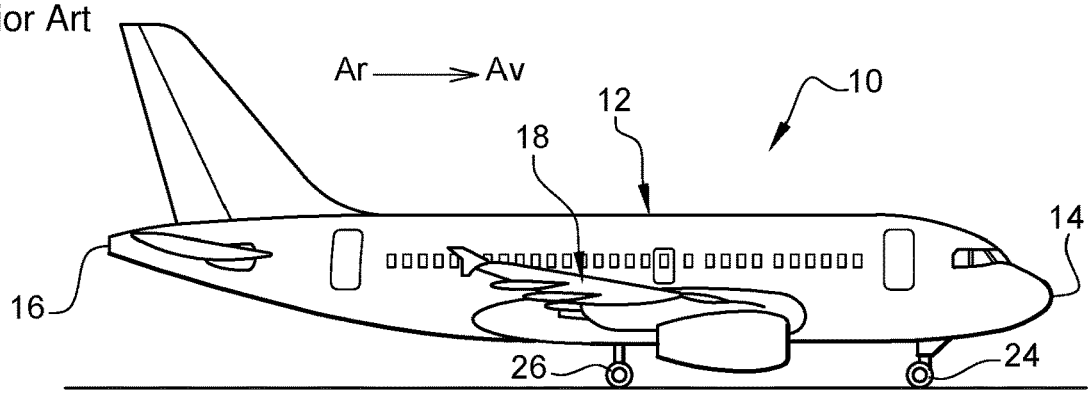
Fig. 2
Prior Art
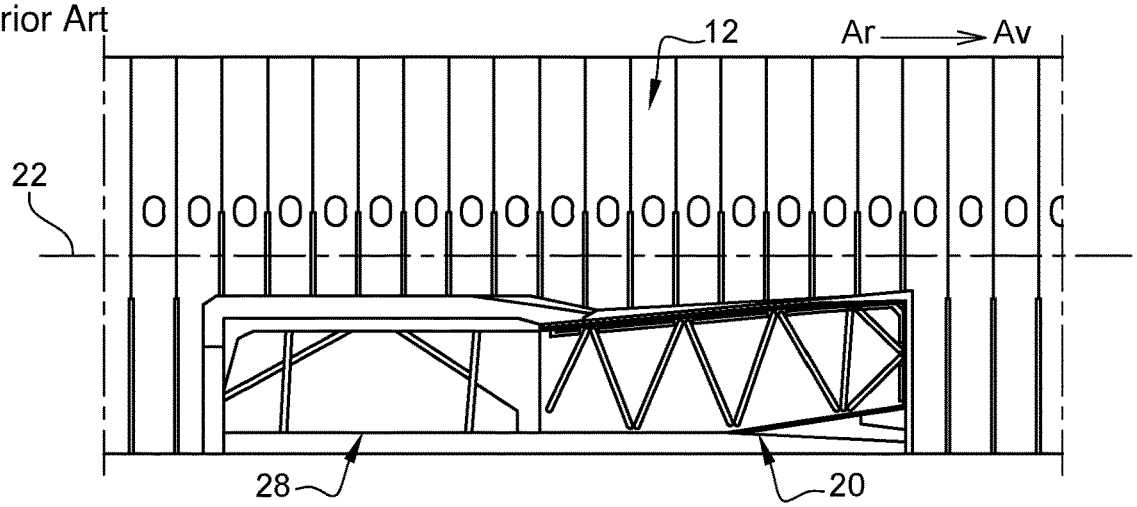
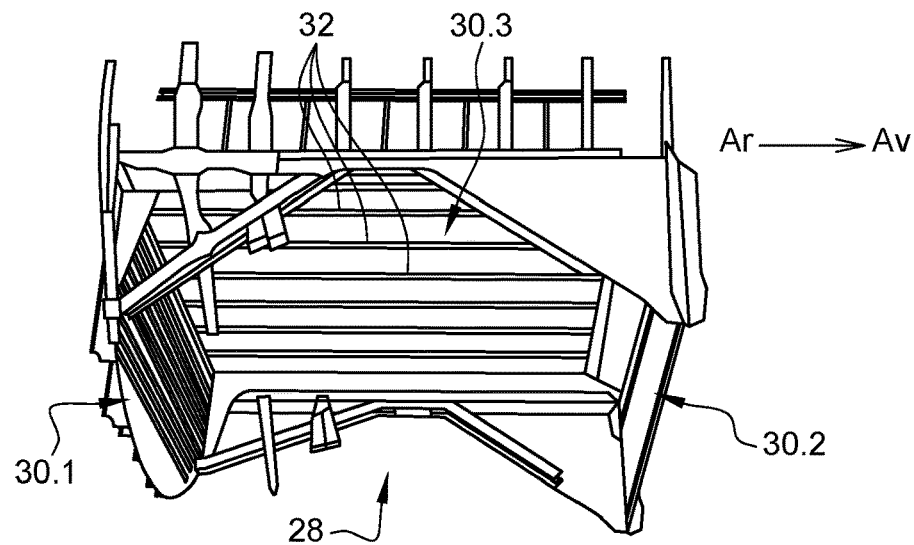
Fig. 3
Prior Art

AIRCRAFT INCLUDING A REINFORCED MAIN LANDING GEAR BOX

CROSS-REFERENCES TO RELATED APPLICATIONS

This application claims the benefit of the French patent application No. 2100260 filed on Jan. 12, 2021, the entire disclosures of which are incorporated herein by way of reference.

FIELD OF THE INVENTION

The present application relates to an aircraft comprising a reinforced main landing gear bay.

BACKGROUND OF THE INVENTION

As illustrated in FIGS. 1 and 2, an aircraft 10 comprises a fuselage 12 that extends between a nose 14 and a tail 16, and also wings 18 that are disposed on either side of the fuselage 12 and connected to the latter by a central wing box 20.

For the remainder of the description, a longitudinal axis 22 of the aircraft 10 corresponds to the horizontal axis, when the aircraft 10 is on the ground, which extends from the nose 14 to the tail 16 of the aircraft 10. A longitudinal direction is a direction parallel to the longitudinal axis 22. A longitudinal plane is a plane that is parallel to the longitudinal axis 22. A vertical median plane is a vertical plane passing through the longitudinal axis 22. A transverse plane is a plane perpendicular to the longitudinal axis 22.

The aircraft 10 comprises a front landing gear 24 positioned in proximity to the nose 14 and also two main landing gears 26 positioned on either side of the fuselage 12, at the rear of the central wing box 20. Each front or main landing gear 24, 26 is configured to occupy a deployed position, as illustrated in FIG. 1, in which it is positioned outside a landing gear bay, and also a retracted position in which it is positioned in the landing gear bay, as illustrated in FIG. 4.

As illustrated in FIGS. 2 to 4, the fuselage 12 comprises a main landing gear bay 28 positioned at the rear of the central wing box 20 and configured to receive the two main landing gears 26 in the retracted position. This main landing gear bay 28 comprises a rear transverse wall 30.1, a front transverse wall 30.2 and also an end wall 30.3. Some of these walls, in particular the rear transverse wall 30.1 and the end wall 30.3, form a sealed barrier between a first, pressurized zone, which is inside the fuselage 12 and outside the main landing gear bay 28, and a second, non-pressurized zone inside the main landing gear bay 28. As a result of this difference in pressure, the end wall 30.3 tends to curve toward the inside of the main landing gear bay 28, as illustrated in FIG. 4. In order to limit this deformation, the end wall 30.3 is reinforced and comprises a plurality of mutually parallel longitudinal beams 32, which are oriented parallel to the longitudinal direction and extend from the rear transverse wall 30.1 as far as the front transverse wall 30.2.

Hereinafter, the inside of the main landing gear bay corresponds to the second, non-pressurized zone. The outside of the landing gear bay corresponds, inter alia, to the first, pressurized zone. An inner face of a wall corresponds to the face of the wall that is oriented toward the inside of the main landing gear bay and an outer face of a wall corresponds to the face of the wall that is oriented toward the outside of the main landing gear bay.

In order to stiffen the end wall 30.3, one solution consists in providing a large number of longitudinal beams. However, this solution is not satisfactory since it leads to an increase in the on-board mass, and this tends to impair the performance of the aircraft. In addition, despite a significant number of longitudinal beams 32, the end wall 30.3 tends to deform on account of its length (dimension considered in the longitudinal direction).

SUMMARY OF THE INVENTION

The present invention seeks to remedy all or some of the drawbacks of the prior art.

To this end, the subject of the invention is an aircraft comprising two main landing gears and also a main landing gear bay configured to house, on either side of a vertical median plane, the two main landing gears in a retracted position, the main landing gear bay comprising a rear transverse wall, a front transverse wall that is approximately parallel to the rear transverse wall and also an end wall that is approximately perpendicular to the rear and front transverse walls and to the vertical median plane, the end wall having a rear edge that is connected to the rear transverse wall and a front edge that is connected to the front transverse wall.

According to the invention, the main landing gear bay comprises at least one strut having a first end that is connected by a first connection to a first anchor point provided on one of the rear and front transverse walls and also a second end that is connected by a second connection to a second anchor point provided on the end wall, each strut being positioned approximately in the vertical median plane and at a distance from the front or rear edge.

The strut makes it possible to limit the deformation of the end wall of the main landing gear bay.

According to another feature, the main landing gear bay comprises a rear strut connecting the rear transverse wall and the end wall and also a front strut connecting the front transverse wall and the end wall.

According to another feature, the rear and front edges of the end wall are separated by a length, and, for each strut, the second anchor point is separated from the rear or front edge of the end wall by a distance corresponding to a quarter of the length.

According to another feature, at least one of the first and second anchor points comprises a first part having a first flange pressed against an inner face of the rear or front transverse wall or of the end wall and also a second part having a second flange pressed against an outer face of the rear or front transverse wall or of the end wall, the first and second flanges being connected to each other by elements that pass through the rear or front transverse wall or the end wall.

According to another feature, the second part is connected to two beams provided on the rear transverse wall or the end wall and positioned on either side of the vertical median plane.

According to another feature, the second part comprises a first plate, which is perpendicular to the vertical median plane and to the rear transverse wall or to the end wall, connected to the beams and to the rear transverse wall or to the end wall.

According to another feature, the second part comprises a second flange pressed against an outer face of the rear transverse wall or of the end wall and connected to the first flange of the first part by elements that pass through the rear transverse wall or the end wall.

According to another feature, the second part comprises a reinforcing rib, which is triangular, connecting the first plate and the second flange, positioned approximately in the vertical median plane.

According to another feature, at least one of the first and second anchor points comprises a third part having a second plate, which is pressed against the first plate of the second part and connected to the latter, and also a third flange pressed against the rear transverse wall or the end wall and connected to the first flange of the first part by elements that pass through the rear transverse wall or the end wall.

According to another feature, the third part comprises a reinforcing rib, which is triangular, connecting the second plate and the third flange, positioned approximately in the vertical median plane.

According to another feature, each connection comprises a pivoting connection having a pivot axis perpendicular to the vertical median plane and a ball joint.

BRIEF DESCRIPTION OF THE DRAWINGS

Other features and advantages will become apparent from the following description of the invention, which description is given solely by way of example, with reference to the appended drawings in which:

FIG. 1 is a side view of an aircraft,

FIG. 2 is a longitudinal section of a part of the fuselage of the aircraft visible in FIG. 1, FIG. 3 is a perspective view of an empty main landing gear bay illustrating an embodiment of the prior art.

DETAILED DESCRIPTION OF THE PREFERRED EMBODIMENTS

Figure 4:
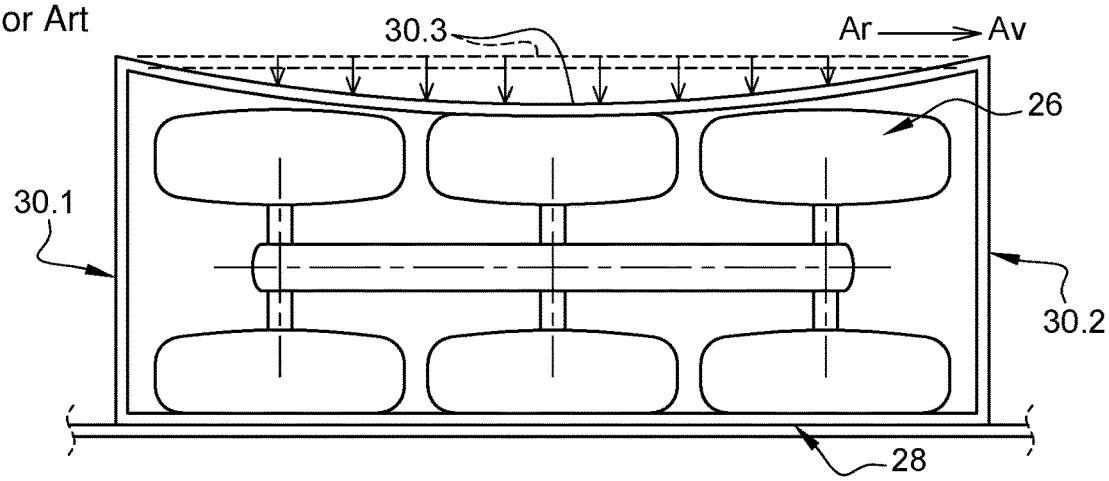
FIG. 4 is a longitudinal section of the main landing gear bay visible in FIG. 3, showing deformation of an end wall.
Figure 5:
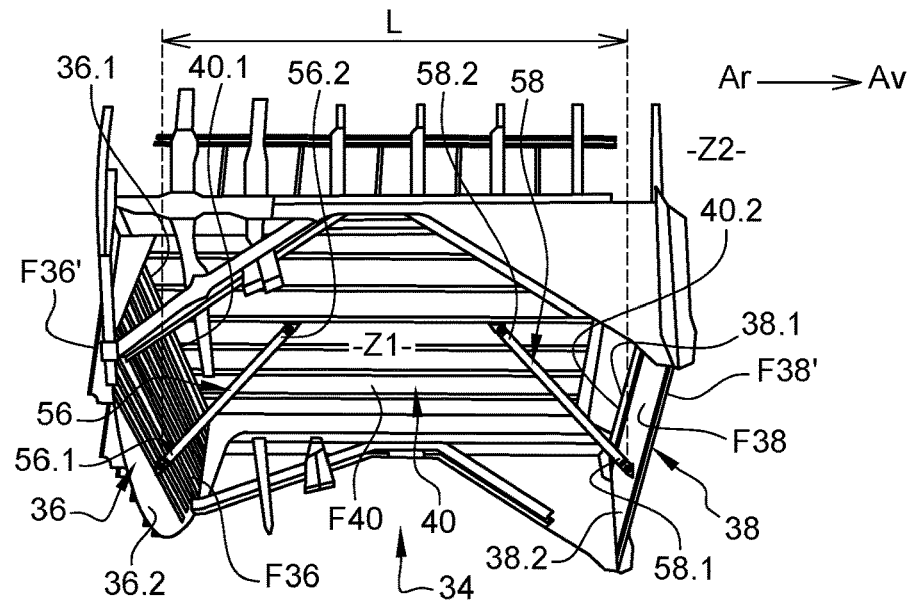
FIG. 5 is a perspective view of a main landing gear bay illustrating an embodiment of the invention.
Figure 6:
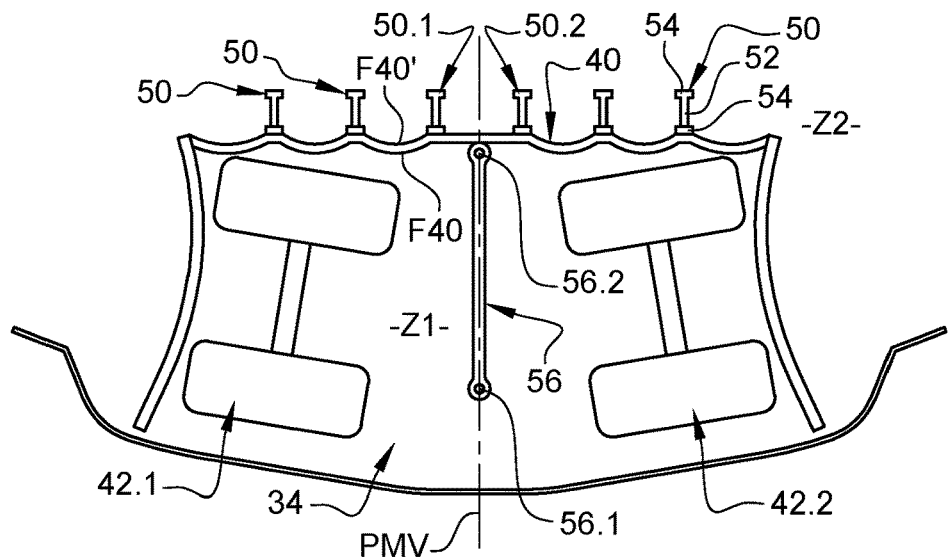
FIG. 6 is a transverse section of a main landing gear bay illustrating an embodiment of the invention.

According to an embodiment visible in FIGS. 5 and 6, a main landing gear bay 34 comprises a rear transverse wall 36 that is perpendicular to a vertical median plane PMV, a front transverse wall 38 that is approximately parallel to the rear transverse wall 36 and also an end wall 40 that is approximately perpendicular to the rear and front transverse walls 36, 38 and also to the vertical median plane PMV. The end wall 40 is positioned symmetrically with respect to the vertical median plane PMV. The front transverse wall 38 can form part of a central wing box.

The main landing gear bay 34 delimits a first zone Z1 configured to house two main landing gears 42.1, 42.2 when they are in the retracted position, positioned on either side of the vertical median plane PMV, as illustrated in FIG. 6. The end wall 40, and optionally at least one of the rear and front transverse walls 36, 38, separate(s) the first zone Z1, which is non-pressurized, from a second zone Z2, which is pressurized, situated inside the fuselage and outside the main landing gear bay 34. According to one configuration, the end wall 40 and the rear transverse wall 36 separate the first, non-pressurized zone Z1 from the second, pressurized zone Z2 and form a sealed barrier.

The rear transverse wall 36 comprises an upper side 36.1 connected to the end wall 40 and a lower side 36.2 at a distance from the end wall 40. The front transverse wall 38 comprises an upper side 38.1 connected to the end wall 40 and a lower side 38.2 at a distance from the end wall 40. The end wall 40 comprises a rear edge 40.1 connected to the upper side 36.1 of the rear transverse wall 36 and a front edge 40.2 connected to the upper side 38.1 of the front transverse wall 38. The end wall 40 has a length L separating the rear and front edges 40.1, 40.2, which dimension is considered in a direction parallel to the longitudinal direction.

The rear transverse wall 36 comprises an inner face F36 oriented toward the first zone Z1 of the main landing gear bay 34 and an outer face F36' on the opposite side to the inner face F36. The front transverse wall 38 comprises an inner face F38 oriented toward the first zone Z1 of the main landing gear bay 34 and an outer face F38' on the opposite side to the inner face F38. The end wall 40 comprises an inner face F40 oriented toward the first zone Z1 of the main landing gear bay 34 and an outer face F40' on the opposite side to the inner face F40.

Figure 7:
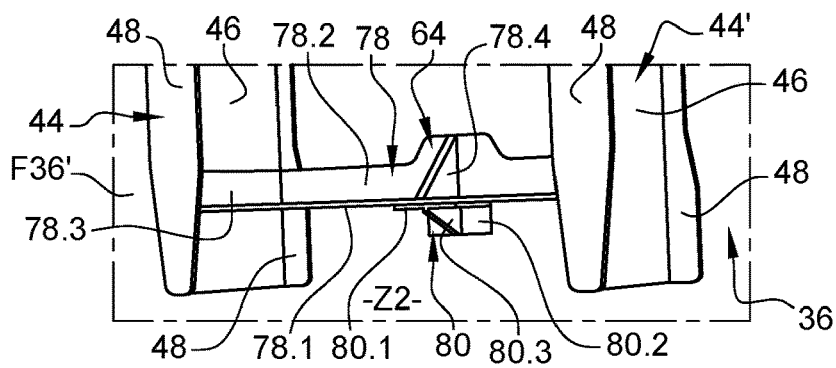
FIG. 7 is a perspective view, from a first viewing angle situated outside the main landing gear bay, of a first anchor point of a rear strut visible in FIG. 5.
Figure 8:
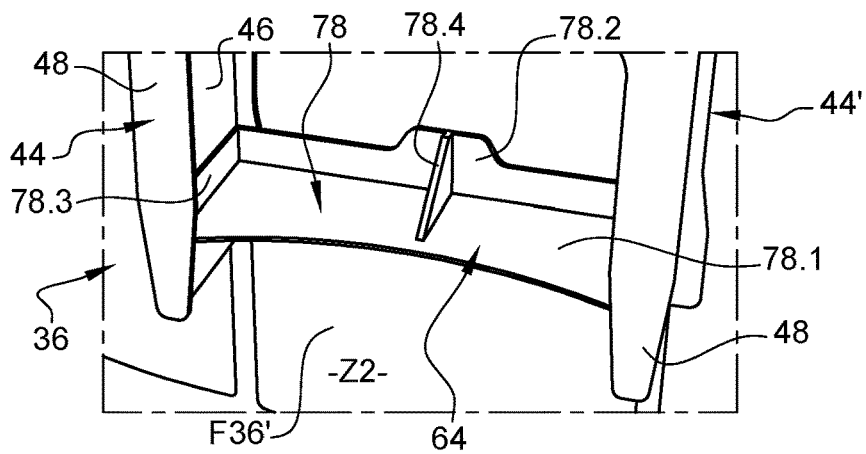
FIG. 8 is a perspective view, from a second viewing angle situated outside the main landing gear bay, of the first anchor point of the rear strut visible in FIG. 7.
Figure 9:
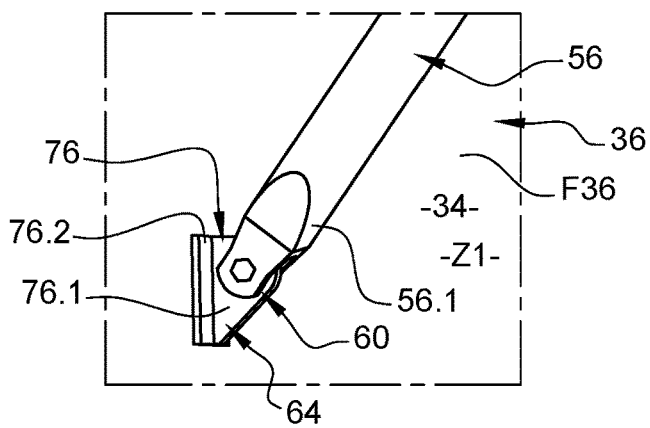
FIG. 9 is a perspective view, from a viewing angle situated inside the main landing gear bay, of the first anchor point of the rear strut visible in FIG. 7.
Figure 10:
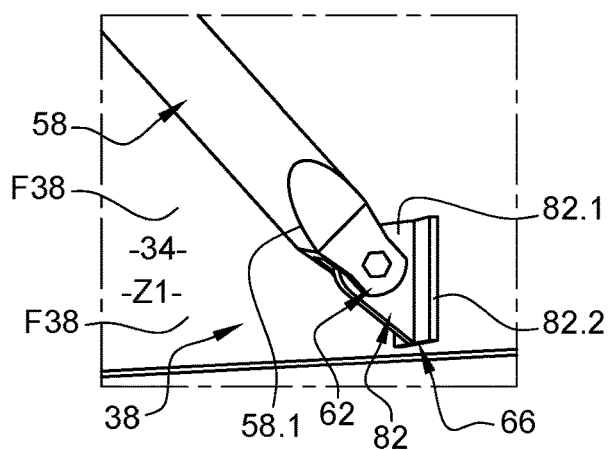
FIG. 10 is a perspective view, from a viewing angle situated inside the main landing gear bay, of a first anchor point of a front strut visible in FIG. 5.
Figure 11:
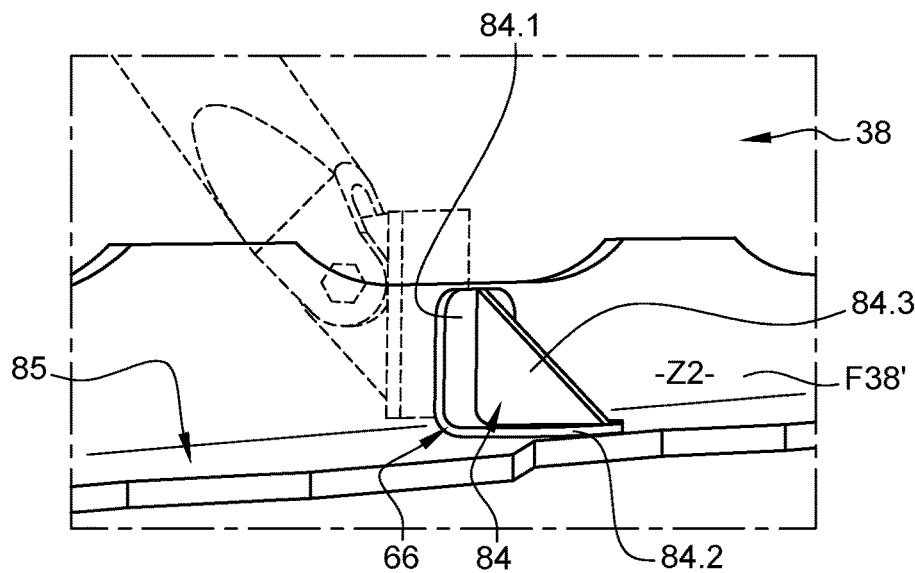
FIG. 11 is a perspective view, from a viewing angle situated outside the main landing gear bay, of the first anchor point of the front strut visible in FIG. 10.

According to a configuration visible in FIG. 7, the rear transverse wall 36 is reinforced and comprises vertical beams 44, 44' positioned symmetrically with respect to the vertical median plane PMV. Each vertical beam 44, 44' has an I-shaped section and has a web 46 positioned in a plane parallel to the vertical median plane PMV and also two flanges 48 perpendicular to the web 46, which are positioned symmetrically with respect to the web 46, at each end thereof, one of the flanges 48 being pressed against the outer face F36' of the rear transverse wall 36. The rear transverse wall 36 comprises two vertical beams 44, 44', one right and one left, positioned on either side of the vertical median plane PMV. The invention is not restricted to this embodiment for the vertical beams 44, 44'.

Figure 12:
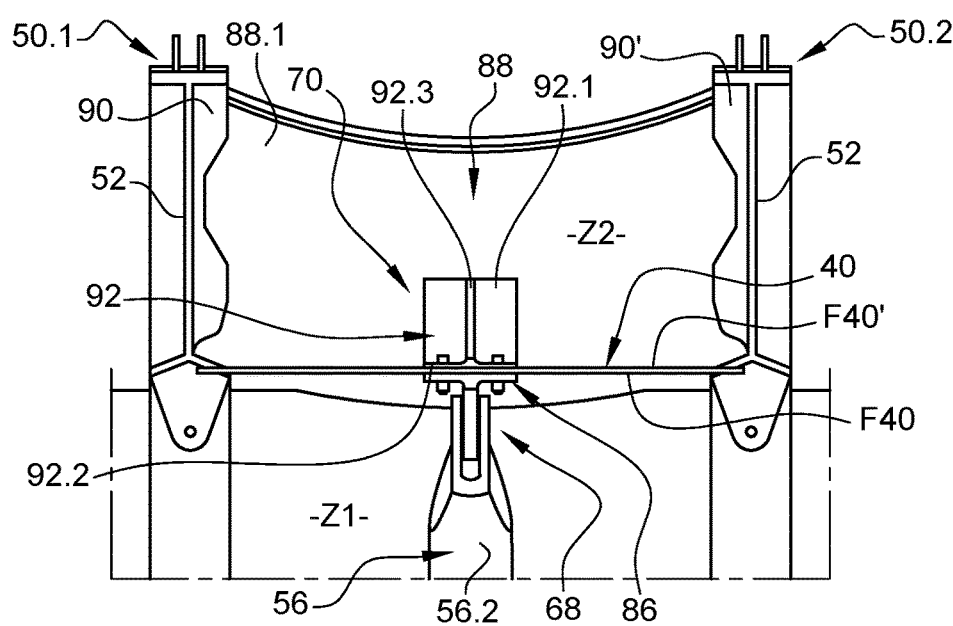
FIG. 12 is a transverse section of a part of the main landing gear bay showing a second anchor point of the rear strut visible in FIG. 5.
Figure 13:
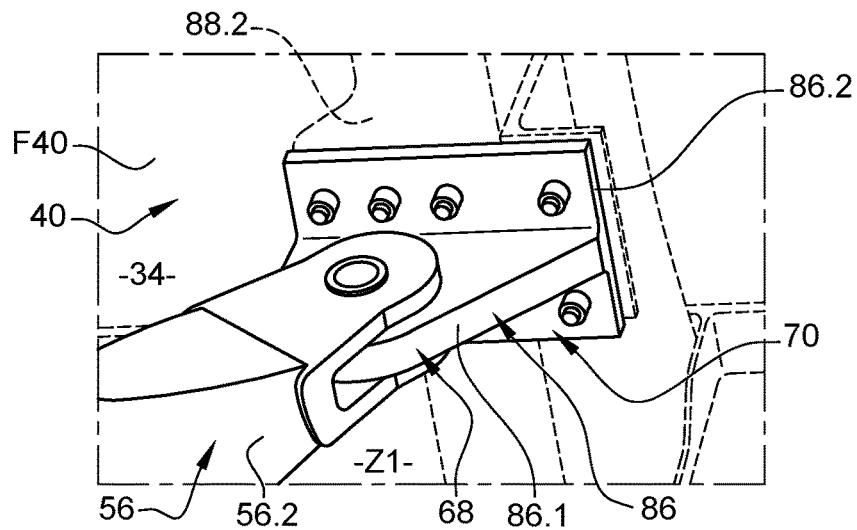
FIG. 13 is a perspective view, from a viewing angle situated inside the main landing gear bay, of the second anchor point of the rear strut visible in FIG. 12.

According to a configuration visible in FIGS. 6 and 12, the end wall 40 is reinforced and comprises longitudinal beams 50, which are parallel to the longitudinal direction, positioned symmetrically with respect to the vertical median plane PMV. These longitudinal beams 50 are distributed over the entire width of the end wall 40 (dimension considered in the transverse direction). Each longitudinal beam 50 has an I-shaped section and has a web 52 positioned in a plane parallel to the vertical median plane PMV and also two flanges 54 perpendicular to the web 52, which are positioned symmetrically with respect to the web 52, at each end thereof, one of the flanges 54 being pressed against the outer face F40' of the end wall 40. The end wall 40 can be produced as a single piece or a plurality of juxtaposed parts, one between each pair of longitudinal beams 50. The invention is not restricted to this embodiment for the longitudinal beams 50.

The end wall 40 comprises at least two longitudinal beams 50.1, 50.2, one right and one left, positioned on either side of the vertical median plane PMV, closest to the latter.

The rear and front transverse walls 36, 38, the end wall 40, the vertical beams 44, 44', the longitudinal beams 50, 50.1, 50.2 and also the main landing gears 41.2, 42.2 are not described further since they can be identical to those of the prior art.

The main landing gear bay 34 comprises at least one strut 56, 58 connecting the rear or front transverse wall 36, 38 and the end wall 40, positioned approximately in the vertical median plane PMV, at a distance from the front or rear edge 40.1, 40.2. According to one configuration, the main landing gear bay 34 comprises a rear strut 56 connecting the rear transverse wall 36 and the end wall 40. According to another configuration, the main landing gear bay 34 comprises a rear strut 56 connecting the rear transverse wall 36 and the end wall 40 and also a front strut 58 connecting the front transverse wall 38 and the end wall 40, the rear and front struts 56, 58 being positioned approximately in the vertical median plane PMV.

Each strut 56, 58 makes it possible to limit the deformation of the end wall 40 in the event of significant differences in pressure on either side of the end wall 40.

Each rear or front strut 56, 58 comprises a first end 56.1, 58.1 that is connected by a first connection 60, 62 to a first anchor point 64, 66 provided on the rear or front transverse wall 36, 38 and also a second end 56.2, 58.2 that is connected by a second connection 68 to a second anchor point 70 provided on the end wall 40.

The first anchor point 64 of the rear strut 56 is positioned in proximity to the lower side 36.2 of the rear transverse wall 36. The first anchor point 66 of the front strut 58 is positioned in proximity to the lower side 38.2 of the front transverse wall 38.

For each rear or front strut 56, 58, the second anchor point 70 is separated from the rear or front edge 40.1, 40.2 of the end wall 40 by a distance L/4 corresponding to around a quarter of the length L of the end wall 40 or slightly less than a quarter of the length L. This position of the second anchor points 70 makes it possible to optimize the reinforcement of the end wall 40.

According to one embodiment, the first anchor point 64 is connected to the vertical beams 44, 44' of the rear transverse wall 36 so as to ensure a better transfer of load between the rear strut 56 and the rear transverse wall 36.

According to one configuration, the first anchor point 64 of the rear strut 56 comprises a first part 76, also called rod fitting, positioned against the inner face F36 of the rear transverse wall 36 and also at least one second part 78, also called reinforcing rib, positioned against the outer face F36' of the rear transverse wall 36.

The first part 76 comprises a web 76.1 and a first flange 76.2 pressed against the inner face F36 of the rear transverse wall 36. The second part 78 comprises a first plate 78.1 perpendicular to the vertical median plane PMV and to the rear transverse wall 36, which has three sides adjoining the outer face F36' of the rear transverse wall 36 and the webs 46 of the vertical beams 44, 44' and also a second flange 78.2 provided at one side of the first plate 78.1 and pressed against the outer face F36' of the rear transverse wall 36. The first and second flanges 76.2, 78.2 of the first and second parts 76, 78 are connected to each other by screws, rivets or any other similar connecting element that passes through the rear transverse wall 36.

The second part 78 comprises flanks 78.3 provided at two sides of the first plate 78.1 and pressed against the webs 46 of the vertical beams 44, 44'. These flanks 78.3 are connected to the webs 46 of the vertical beams 44, 44' by screws, rivets or any other similar connecting element.

According to one embodiment, the second part 78 comprises a reinforcing rib 78.4, which is triangular, connecting the first plate 78.1 and the second flange 78.2, positioned approximately in the vertical median plane PMV.

According to one configuration, the first anchor point 64 of the rear strut 56 comprises a third part 80, also called counter-fitting, positioned against the outer face F36' of the rear transverse wall 36. This third part comprises a second plate 80.1 pressed against the first plate 78.1 of the second part 78 and connected to the latter by screws, rivets or any other similar connecting element, and also a third flange 80.2 pressed against the outer face F36' of the rear transverse wall 36 and connected to the first flange 76.2 of the first part 76 by screws, rivets or any other similar connecting element that passes through the rear transverse wall 36. According to one embodiment, the third part 80 comprises a reinforcing rib 80.3, which is triangular, connecting the second plate 80.1 and the third flange 80.2, positioned approximately in the vertical median plane PMV.

According to one configuration, the first anchor point 66 of the front strut 58 comprises a first part 82, also called rod fitting, positioned against the inner face F38 of the front transverse wall 38 and also at least one second part 84, also called counter-fitting, positioned against the outer face F38' of the front transverse wall 38.

The first part 82 comprises a web 82.1 and a first flange 82.2 pressed against the inner face F38 of the front transverse wall 38. The second part 84 comprises a second flange 84.1 pressed against the outer face F38' of the front transverse wall 38 and also a third flange 84.2, which is perpendicular to the vertical median plane PMV and to the front transverse wall 38, which is pressed against a reinforcer 85 of the front transverse wall 38 and connected to the latter by screws, rivets or any other similar connecting element. According to one configuration, the reinforcer 85 is an angle bar of the central wing box. The first and second flanges 82.2, 84.2 of the first and second parts 82, 84 are connected to each other by screws, rivets or any other similar connecting element that passes through the front transverse wall 38.

According to one embodiment, the second part 84 comprises a reinforcing rib 84.3, which is triangular, connecting the second and third flanges 84.1, 84.2, positioned approximately in the vertical median plane PMV.

According to one embodiment, each second anchor point 70 is connected to the longitudinal beams 50.1, 50.2 of the end wall 40 so as to ensure a better transfer of load between the rear or front strut 56, 58 and the end wall 40.

According to one configuration, each second anchor point 70 comprises a first part 86, also called rod fitting, positioned against the inner face F40 of the end wall 40 and also at least one second part 88, also called reinforcing rib, positioned against the outer face F40' of the end wall 40.

The first part 86 comprises a web 86.1 and a first flange 86.2 pressed against the inner face F40 of the end wall 40. The second part 88 comprises a first plate 88.1, which is perpendicular to the vertical median plane PMV and to the end wall 40, which has three sides adjoining the outer face F40' of the end wall 40 and the webs 52 of the longitudinal beams 50.1, 50.2' and also a second flange 88.2, which is provided at one of the three sides of the first plate 88.1, which is pressed against the outer face F40' of the end wall 40. The webs 52 of the longitudinal beams 50.1, 50.2 comprise fins 90, 90' connected to the first plate 88.1 of the second part 88 by screws, rivets or any other similar connecting element. The connection between the second part 88 and the longitudinal beams 50.1, 50.2 is not restricted to this embodiment.

The first and second flanges 86.2, 88.2 of the first and second parts 86, 88 are connected to each other by screws, rivets or any other similar connecting element that passes through the end wall 40.

According to one embodiment, the second part 88 comprises a reinforcing rib, which is triangular, connecting the first plate and the second flange, positioned approximately in the vertical median plane PMV.

According to one configuration, each second anchor point 70 comprises a third part 92, also called counter-fitting, positioned against the outer face F40' of the end wall 40. This third part 92 comprises a second plate 92.1 pressed against the first plate 88.1 of the second part 88 and connected to the latter by screws, rivets or any other similar connecting element, and also a third flange 92.2 pressed against the outer face F40' of the end wall 40, the first and third flanges 86.2, 92.2 of the first and third parts 86, 92 being connected by screws, rivets or any other similar connecting element that passes through the end wall 40. According to one embodiment, the third part 92 comprises a reinforcing rib 92.3, which is triangular, connecting the second plate 92.1 and the third flange 92.2, positioned approximately in the vertical median plane PMV.

Whatever the embodiment, at least one anchor point 64, 66, 70 comprises a first part 76, 82, 86 that has a first flange 76.2, 82.2, 86.2 pressed against an inner face F36, F38, F40 of a rear or front transverse wall or of an end wall 36, 38, 40 of the main landing gear bay 34 and also a second part 78, 84, 88 that has a second flange 78.2, 84.2, 88.2 pressed against an outer face F36', F38', F40' of the rear or front transverse wall or of the end wall 36, 38, 40 of the main landing gear bay 34, the first and second flanges 76.2, 78.2, 82.2, 84.2, 86.2, 88.2 being connected to each other by elements that pass through the rear or front transverse wall or the end wall 36, 38, 40. This configuration makes it possible to establish a good seal at each anchor point 64, 66, 70.

When the rear transverse wall 36 or the end wall comprises two beams 44, 44', 50.1, 50.2 that are disposed on either side of the vertical median plane PMV, the second part 78, 88 comprises a first plate 78.1, 88.1 connected to the two beams 44, 44', 50.1, 50.2 and perpendicular to the second flange 78.2, 88.2.

According to one embodiment, each connection 60, 62, 68 comprises a pivoting and/or ball joint connection 94 having a pivot axis perpendicular to the vertical median plane PMV. According to one configuration, the first and second ends 56.1, 58.1, 56.2, 58.2 each comprise a clevis that has two arms, which are parallel to the vertical median plane PMV and slightly spaced apart from each other, which are configured to house between them the web 76.1, 82.1, 86.1 of one of the first, second, third and fourth anchor points 60, 62, 68 and are positioned in the vertical median plane PMV. For each pivoting connection, each aim of the clevis and the web comprise bores that are aligned in operation and configured to house a cylindrical pivot pin. Advantageously, the pivoting connection 94 comprises a ball joint. This configuration makes it possible to compensate for misalignment between the webs 76.1, 82.1, 86.1 of the various anchor points 60, 62, 68.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
two main landing gears, and
a main landing gear bay configured to house, on either side of a vertical median plane passing through a longitudinal axis of the aircraft which extends from a nose to a tail of the aircraft, the two main landing gears in a retracted position,
the main landing gear bay comprising:
a rear transverse wall,
a front transverse wall that is parallel to the rear transverse wall, and
an end wall that is perpendicular to the rear and front transverse walls and to the vertical median plane, the end wall having a rear edge that is connected to the rear transverse wall and a front edge that is connected to the front transverse wall,
wherein the main landing gear bay comprises:
at least one strut having a first end that is connected by a first connection to a first anchor point provided on one of the rear and front transverse walls, and
a second end that is connected by a second connection to a second anchor point provided on the end wall, the at least one strut being positioned in the vertical median plane and at a distance from the front or rear edge,
wherein at least one of the first and second anchor points comprises a first part having a first flange pressed against an inner face of the rear or front transverse wall or of the end wall and a second part having a second flange pressed against an outer face of the rear or front transverse wall or of the end wall, the first and second flanges being connected to each other by elements that pass through the rear or front transverse wall or the end wall,
wherein the second part is connected to two beams provided on the rear transverse wall or the end wall and positioned on either side of the vertical median plane,
wherein the second part comprises a first plate, which is perpendicular to the vertical median plane and to the rear transverse wall or to the end wall, connected to the beams and to the rear transverse wall or to the end wall,
wherein the second part comprises a second flange pressed against an outer face of the rear transverse wall or of the end wall and connected to the first flange of the first part by elements that pass through the rear transverse wall or the end wall.

2. The aircraft as claimed in claim 1, wherein the main landing gear bay comprises a rear strut connecting the rear transverse wall and the end wall and a front strut connecting the front transverse wall and the end wall.

3. The aircraft as claimed in claim 1, wherein the rear and front edges of the end wall are separated by a length and wherein, for the at least one strut, the second anchor point is separated from the rear or front edge of the end wall by a distance corresponding to a quarter of the length.

4. The aircraft as claimed in claim 1, wherein the second part comprises a reinforcing rib, which is triangular, connecting the first plate and the second flange, positioned in the vertical median plane.

5. The aircraft as claimed in claim 1, wherein each connection comprises at least one of a pivoting or ball joint connection having a pivot axis perpendicular to the vertical median plane.

6. The aircraft as claimed in claim 1, wherein each connection comprises at least one of a pivoting or ball joint connection having a pivot axis perpendicular to the vertical median plane.

7. An aircraft comprising:
two main landing gears, and
a main landing gear bay configured to house, on either side of a vertical median plane passing through a longitudinal axis of the aircraft which extends from a nose to a tail of the aircraft, the two main landing gears in a retracted position,
the main landing gear bay comprising:
 a rear transverse wall,
 a front transverse wall that is parallel to the rear transverse wall, and
 an end wall that is perpendicular to the rear and front transverse walls and to the vertical median plane, the end wall having a rear edge that is connected to the rear transverse wall and a front edge that is connected to the front transverse wall,
wherein the main landing gear bay comprises:
 at least one strut having a first end that is connected by a first connection to a first anchor point provided on one of the rear and front transverse walls, and
 a second end that is connected by a second connection to a second anchor point provided on the end wall, the at least one strut being positioned in the vertical median plane and at a distance from the front or rear edge,
wherein at least one of the first and second anchor points comprises a first part having a first flange pressed against an inner face of the rear or front transverse wall or of the end wall and a second part having a second flange pressed against an outer face of the rear or front transverse wall or of the end wall, the first and second flanges being connected to each other by elements that pass through the rear or front transverse wall or the end wall,
wherein the second part is connected to two beams provided on the rear transverse wall or the end wall and positioned on either side of the vertical median plane'
wherein the second part comprises a first plate, which is perpendicular to the vertical median plane and to the rear transverse wall or to the end wall, connected to the beams and to the rear transverse wall or to the end wall,
wherein at least one of the first and second anchor points comprises a third part having a second plate, which is pressed against the first plate of the second part and connected to the latter, and also a third flange pressed against the rear transverse wall or the end wall and connected to the first flange of the first part by elements that pass through the rear transverse wall or the end wall.

8. The aircraft as claimed in claim 7, wherein the third part comprises a reinforcing rib, which is triangular, connecting the second plate and the third flange, positioned in the vertical median plane.

\* \* \* \* \*